UNITED STATES PATENT OFFICE.

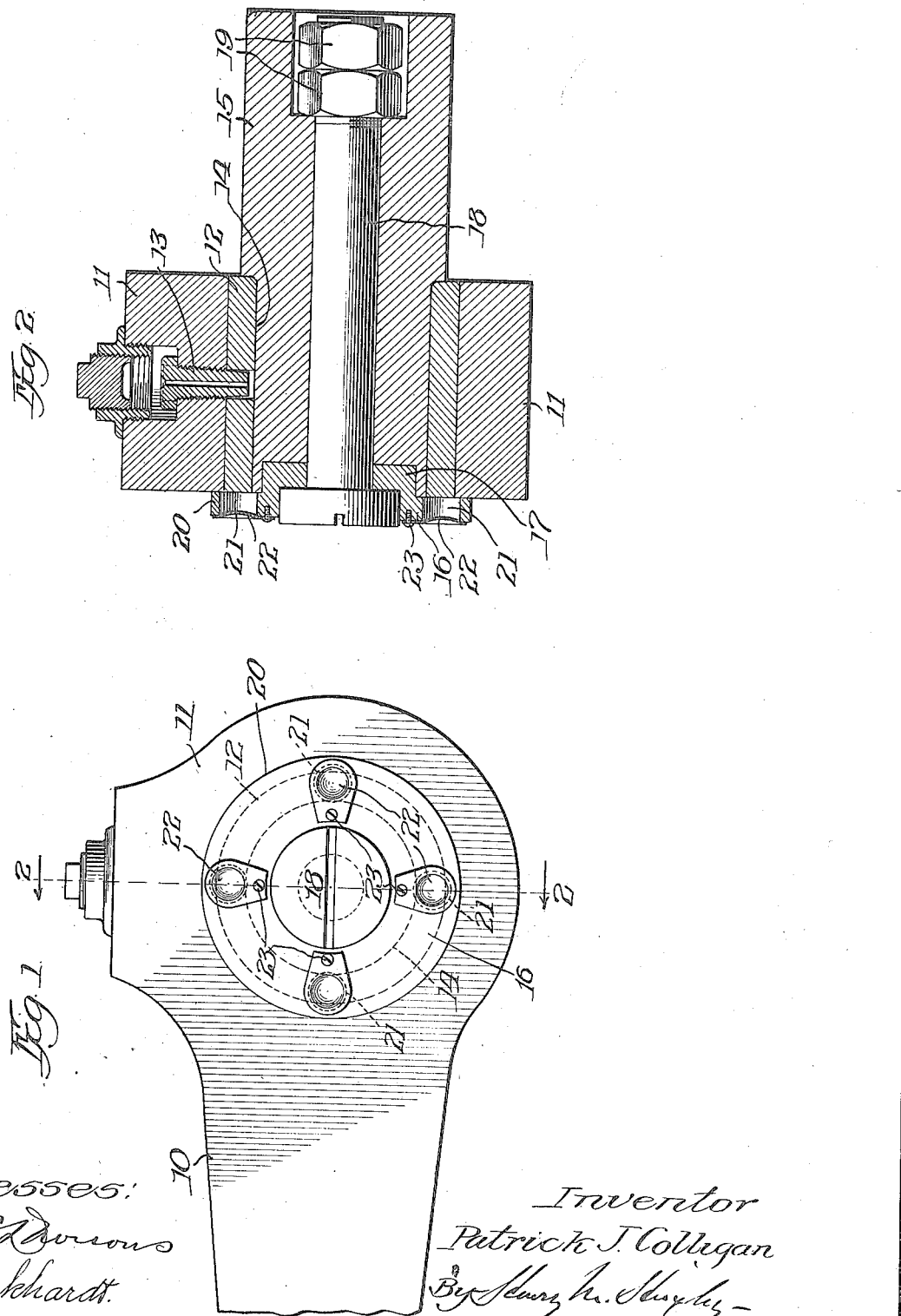

PATRICK J. COLLIGAN, OF CHICAGO, ILLINOIS.

BEARING DEVICE.

1,207,713.  Specification of Letters Patent.  Patented Dec. 12, 1916.

Application filed July 28, 1916. Serial No. 111,770.

*To all whom it may concern:*

Be it known that I, PATRICK J. COLLIGAN, a citizen of the United States, residing at Chicago, in the county of Cook and State of Illinois, have invented certain new and useful Improvements in Bearing Devices, of which the following is a specification.

My invention relates to bearing devices, and refers particularly to mechanism so constructed that inspection of the bushings may be readily made at any time.

In the construction of bearings it is often necessary or desirable to provide a collar or other similar device adjacent to the journal portion of the shaft which rotates within the bushing or bushings in order to prevent longitudinal movement of the shaft with respect to the bushing. It will be evident that under ordinary circumstances the collar or other member placed on the shaft conceals the bushing of the bearing member so that it is impossible to accurately determine the amount of wear of the bushing which has taken place without removal of the collar or other similar member. In connection with the bearings of locomotives, and particularly the crank pins of the same, it is necessary that frequent inspection of the bushings should be made in order to insure safety. In fact, it is required by the Interstate Commerce Commission that the bushings of such bearings shall be inspected at least once every thirty days to determine the wear of the bushings so that replacements may be made when necessary. In order to effect such inspection great labor has been necessary since the collars or other members concealing the ends of the bushings must be removed in order to afford proper inspection of the bushings.

It is the object of my invention to so construct the collar or other covering member of the bushing so that inspection may be readily made at any time to determine the wear of the bushing, thus doing away with a large amount of labor and consequent expense, while at the same time safety is promoted by the provision of means for practically instantaneously inspecting the bushings at any time.

A further object of my invention resides in the fact that when a collar is removed there is always danger that the collar bolt will not be properly replaced, and accidents have frequently taken place from this cause. By the use of my invention, on the other hand, this danger is entirely eliminated since it is no longer necessary to remove the collar to afford inspection of the bushing. In general, I accomplish the result mentioned by providing the collar or other similar member with one or more openings, either in the form of round holes, slots, or the like, which are located in the circular plane of the bushing, so that the entire thickness of the end of the bushing may be readily seen. It is sometimes desirable to provide covering means for these apertures or openings to prevent access of dust and other impurities to the journal, although I find in usual practice that such covering means are unnecessary. These and other advantages of my invention will be more readily understood by reference to the accompanying drawings, in which—

Figure 1 is a side elevation of a connecting rod of a locomotive, in the end of which is provided a crank pin having applied thereto a collar embodying my invention, and Fig. 2 is a vertical transverse section taken on the line 2—2 of Fig. 1.

The connecting rod 10 has at its end the enlarged bearing portion 11, which is apertured and contains the bushing or bearing member 12. The bearing portion 11 of the rod 10 may be provided with the usual oiling device 13, which extends through the bushing 12 to provide oil for the journal 14 of the short shaft or crank pin 15. The collar 16, preferably having the boss 17, is fastened to the end of the crank pin 15 by means of the collar bolt 18 securely held in position by the nuts 19. The flange portion 20 of the collar 16 covers the end of the bushing 12. In this flange portion 20 are provided one or more inspection openings 21 which are sufficiently large so that the entire thickness of the bushing 12 at the points opposite the openings 21 is visible. It will be apparent that by means of the inspection openings 21 the exact wear of the bushing 12 may be accurately determined at any time without necessity of removing the collar 16 in order to examine the bushing 12. If desired, the inspection openings 21 may be provided with the covering members 22 of any suitable design, each of the covering members, specifically illustrated in the drawings, consisting of a relatively flat spring member extending over the opening and held in position by means of a screw or pin 23 so that the covering 22 may be readily rotated, with the screw or pin 23 as a pivot, so that the opening 21 is uncovered. In order to more securely maintain each of the covering members 22 in its normal position, each of said members is preferably provided with a cupped central portion extending into the inspection opening 21, as clearly shown in Fig. 2.

It will be apparent to those skilled in the art that many changes could be made in the detailed construction of the various parts which I have described without departing from the spirit or scope of my invention, as defined in the appended claims.

What I claim is:

1. In a bearing construction, the combination of a bushing, a shaft engaged by said bushing, and a member adjacent to and covering the end of said bushing, said member being provided with an inspection opening in line with said bushing.

2. In a bearing construction, the combination of a bushing, a shaft engaged by said bushing, and a member adjacent to and covering the end of said bushing, said member being provided with an inspection opening in line with said bushing and extending completely across the thickness of the same.

3. In a bearing construction, the combination of a bushing, a shaft rotatable within said bushing, and a member carried by said shaft and adjacent to the end of said bushing, said member being provided with an inspection opening in line with said bushing.

4. In a bearing contruction, the combination of a bushing, a shaft rotatable within said bushing, and a member carried by said shaft and adjacent to the end of said bushing, said member being provided with an inspection opening in line with said bushing and extending completely across the thickness of the same.

5. In a bearing construction, the combination of a bushing, a shaft rotatable within said bushing, and a collar adjacent the end of said bushing, said collar having an inspection opening in line with said bushing.

6. In a bearing construction, the combination of a bushing, a shaft engaged by said bushing, and a collar carried on the end of said shaft and covering the end of said bushing, said collar having an inspection opening in line with said bushing and extending completely across the thickness of the same.

7. In a bearing construction, the combination of a bushing, a shaft engaged by said bushing, a member adjacent to and covering the end of said bushing, said member being provided with an inspection opening in line with said bushing, and readily removable means for closing said opening.

8. In a bearing construction, the combination of a bushing, a shaft rotatable within said bushing, a collar carried by said shaft and covering the end of said bushing, said collar being provided with an inspection opening in line with said bushing, and rotatable means for closing said opening.

In witness whereof, I hereunto subscribe my name this 25" day of July, A. D. 1916.

PATRICK J. COLLIGAN.